US006671726B1

United States Patent
Hanway

(10) Patent No.: US 6,671,726 B1
(45) Date of Patent: Dec. 30, 2003

(54) APPARATUS AND METHOD FOR THE CONVENIENT TRANSFER OF DATA BETWEEN A COMPUTER NETWORK AND A NON-CONNECTED COMPUTER

(76) Inventor: John Robert Hanway, 1706 Polk Ford Rd., Stanfield, NC (US) 28163

( * ) Notice: Subject to any disclaimer, the term of this patent is extended or adjusted under 35 U.S.C. 154(b) by 0 days.

(21) Appl. No.: 09/338,107

(22) Filed: Jun. 23, 1999

(51) Int. Cl.[7] .............................................. G06F 15/16
(52) U.S. Cl. ...................... 709/227; 709/232; 713/182; 713/166; 705/400; 705/13
(58) Field of Search ................. 709/227, 232, 709/225, 228; 713/166; 705/13

(56) References Cited

U.S. PATENT DOCUMENTS

| 5,265,033 A | | 11/1993 | Vajk et al. | |
|---|---|---|---|---|
| 5,812,765 A | * | 9/1998 | Curtis | 395/200.3 |
| 5,826,267 A | | 10/1998 | McMillan | |
| 5,864,676 A | * | 1/1999 | Beer et al. | 395/200.59 |
| 5,867,821 A | * | 2/1999 | Ballantyne | 705/2 |
| 5,953,504 A | * | 9/1999 | Sokal et al. | 395/200.57 |
| 6,108,790 A | * | 8/2000 | Moriya et al. | 713/202 |
| 6,195,694 B1 | * | 2/2001 | Chen et al. | 709/220 |

* cited by examiner

Primary Examiner—David Wiley
Assistant Examiner—Adnan Mirza

(57) ABSTRACT

A system for conveniently allowing a portable computer user to send and receive e-mail and other data across a computer network, like the Internet, without the need for the portable or laptop computer to have a modem or a conventional connection to the computer network. The e-mail is created on the laptop and stored on a storage medium, such as a floppy disk. The disk is then taken to a conveniently located kiosk terminal where it is read. Account data on the disk identifies the user as a valid user, and the terminal completes the transfer operation by sending e-mail across the Internet, receiving any new e-mail messages, and writing them onto the disk. The user's prepaid account is charged for the data transfer operation, and the disk is then removed from the terminal and read later at the portable computer to view any new e-mails. This process allows one to maintain e-mail correspondence with others without having a modem or having to find a telephone line and going through the process of normally connecting to the Internet through a special telephone number to the user's ISP.

4 Claims, 3 Drawing Sheets

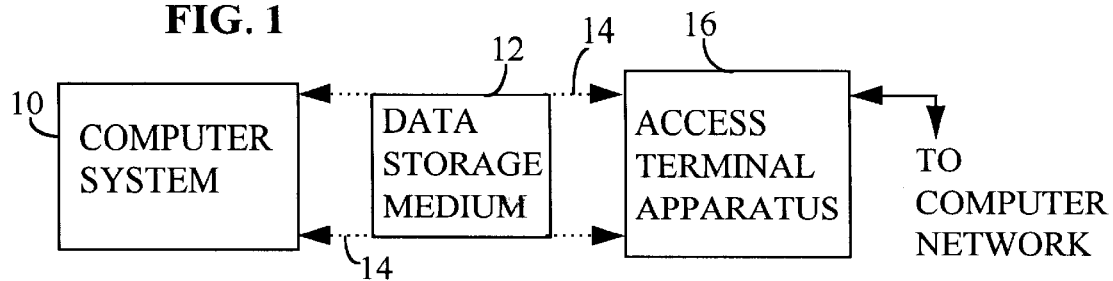
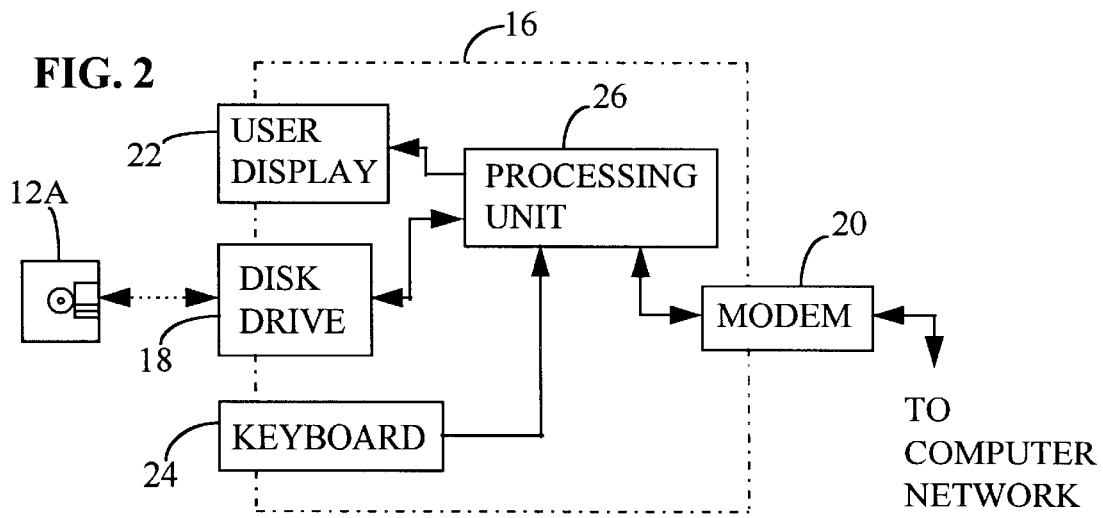
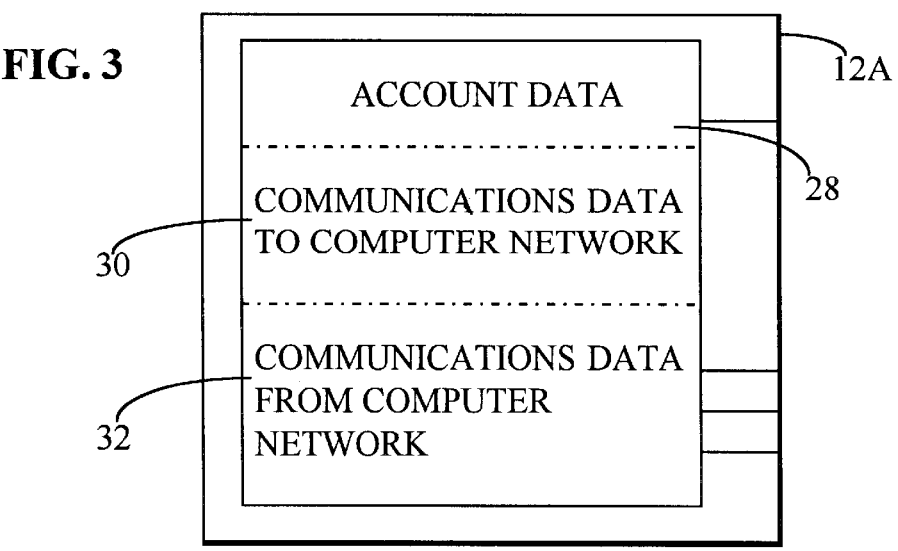

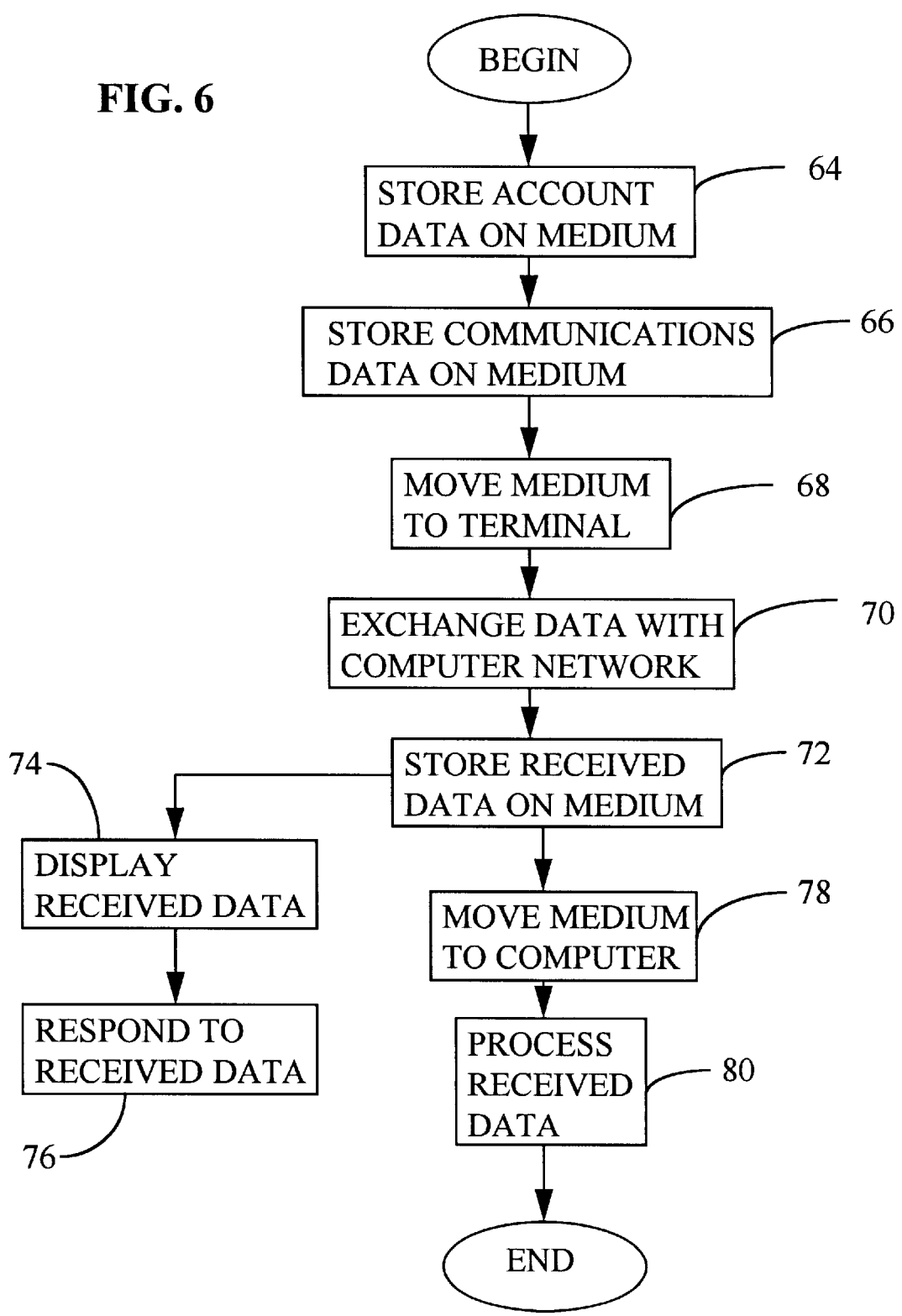

APPARATUS AND METHOD FOR THE CONVENIENT TRANSFER OF DATA BETWEEN A COMPUTER NETWORK AND A NON-CONNECTED COMPUTER

BACKGROUND OF THE INVENTION

This invention relates, in general, to computer systems and, more specifically, to transferring e-mail and other data between a computer network and a computer which is not connected to the network.

Electronic mail messages (e-mail) are becoming more popular today with computer users as a means to communicate with another party. It offers, among other things, the advantages of very fast delivery, economical expense, ability to include files, pictures, and data, and the convenience of avoiding "phone tag" associated with telephone conversations (with e-mail, both composer and reader can do so at their own convenience). While the advantages of e-mail, and exchanges of other data, are easy to implement from home or office based computers, the use of e-mail communication, or exchange of data, is more difficult when the user dose not have access to a computer that is connected to the computer network over which the data is transferred.

The Internet is one of the primary avenues for transferring data between two or more computers. When one of those computers does not have access to the Internet, the quick transfer of data becomes much more difficult. Business people, travellers, tourists, service personnel, and others, frequently are accustomed to using e-mail for conducting daily business and communication with friends and family. One solution which is becoming popular is the use of portable computers that can be taken away from the fixed computer location and used to process and compose e-mails and data. To transfer this information, the user needs to find a "port" or "connection" to the Internet. Various methods are in use today for this purpose, including cellular phone access, modem connections in hotel rooms, airport terminals, and truckstops, and remote computer terminals. While these devices and systems play an important part in extending the access capability to a computer network such as the Internet, they do have some limitations. The user must be able to establish communications with the Internet through these devices before the data can be transferred. For example, a person getting off of an airplane may have just composed three e-mails on his laptop computer while in flight. To send those e-mails, the person would have to find a modem connection and determine the local telephone number for his ISP (Internet Service Provider). After powering-up his computer and opening the mail-reader software, the person would call and establish a connection. Then the e-mail could be sent and received over the network. Not counting any processing or responding to received e-mails, this procedure could take several minutes.

It is desirable therefore, and it is an object of this invention, to provide a method and apparatus for making it easier and faster to exchange data with a computer network while travelling or otherwise being away from a fixed network connection. In addition, it is desirable to provide this ability without the need for having a modem or for finding a telephone connection that is modem compatible. It is also desirable to provide this capability in a manner which will permit the user to compose and review the data or messages on his portable computer while off-line and more at his own convenience.

Several U.S. Patents have been issued which have some relation to the subject matter of this invention. U.S. Pat. No. 5,826,267, issued on Oct. 20, 1998, teaches a web information kiosk for use in high traffic areas, such as airports, malls, transportation terminals, etc. While it does not offer the capabilities of the present invention, it does teach the use of a common, publicly accessible Internet connection. This patent discloses a system whereby the content of the data presented to the user is filtered or customized depending upon the location of the kiosk. This purportedly makes the Internet data obtained easier and less intimidating to use. This system does not provide any means for exchanging data with a storage medium to be processed on another computer.

U.S. Pat. No. 5,265,033, issued on Nov. 23, 1993, generally teaches the use of existing ATM and POS systems for the purpose of reading e-mail messages. This arrangement does not require that the recipient have a computer to read the messages. He simply reads them on the ATM or POS apparatus. Apparently, this invention makes use of existing equipment already in the field. Messages can be sent by selecting pre-coded messages, filling in blanks, or scanning in a written message (see column 14). Access to the system is controlled by a machine readable personal identification card in conjunction with an authorized personal identification number ("PIN"). Although this system can provide some limited e-mail access to a user without a computer, it does not furnish any capabilities to a user who has a portable computer nor does it provide the advantages of speed, convenience, and versatility that the present invention allows.

BRIEF SUMMARY OF THE INVENTION

There is described herein a new and useful system for transferring data between a computer network and a non-connected computer system. This system is especially convenient for keeping current with e-mails while travelling with a portable or laptop personal computer. Both sending and receiving e-mail messages can be accomplished by using this invention.

Typically, the laptop computer user first composes the e-mail messages on his computer which are to be sent to another computer user over the computer network, such as the Internet. With additional software on the laptop, or by using a modified e-mail program, the composed e-mails are written to a storage medium, such as a floppy disk. Additional account information identifying the user can also be written to the disk. Once this process is complete, the disk is taken to a conveniently located terminal kiosk. There, the disk is inserted and the data on the disk is read by the terminal.

The account data is used to determine if the disk data is from a user authorized to use the terminal. If so, the e-mail data is sent to the indicated recipient(s). In addition, any e-mail data directed to the user's e-mail address is sent to the terminal and written onto the disk. The balance in the user's previously created account is adjusted to reflect the charge for performing the terminal services. Upon completion of the data transfers, the disk is removed by the user and eventually read at the laptop computer to view any received e-mails. Of course, the user could do the same procedure without first composing any e-mails if he just wanted to check for any new e-mail messages.

This system allows the transfer of data between a computer and a computer network without the need to have a modem or conventional access to a telephone line to dial into the user's Internet account. Assuming that the terminals are conveniently located in many public travel places, the user can send and receive e-mails quickly and confidentially for a small fee. Additional security can be accomplished by requiring the user to enter an authorization code number at the terminal before full access will be permitted.

BRIEF DESCRIPTION OF THE SEVERAL VIEWS OF THE DRAWING

Further advantages and uses of this invention will become more apparent when considered in view of the following detailed description and drawing, in which:

FIG. 1 is a block diagram of the overall configuration of the invention;

FIG. 2 is a block diagram of an embodiment for the terminal apparatus shown in FIG. 1;

FIG. 3 is a diagram illustrating the data contained on the storage medium shown in FIG. 2;

FIG. 6 is a flow chart illustrating various steps in the operation of the invention.

DETAILED DESCRIPTION OF THE INVENTION

Figure 4:
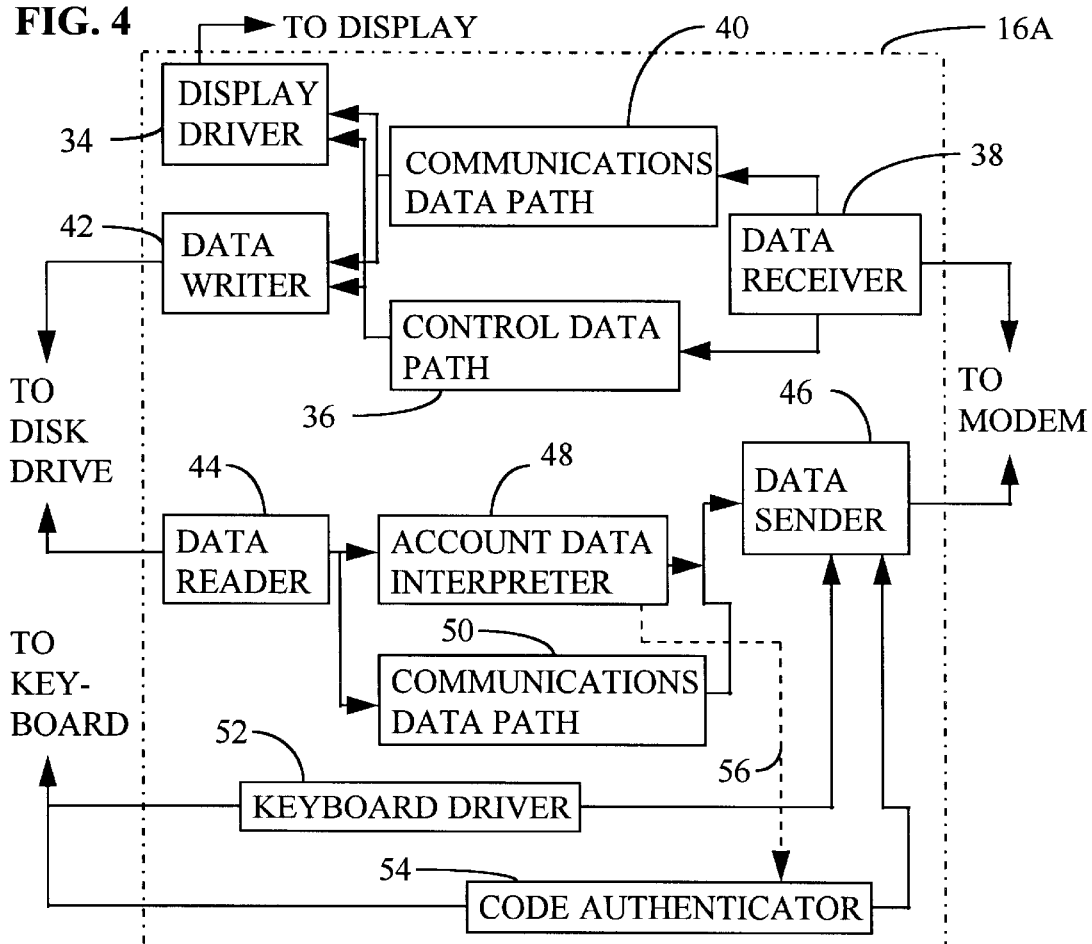
FIG. 4 is a block diagram illustrating the functions of the terminal apparatus.

Throughout the following description, similar reference characters refer to similar elements in all the figures of the drawing.

Referring now to the drawing, and to FIG. 1 in particular, there is shown a block diagram of the overall configuration of the invention. The computer system 10 in this embodiment of the invention is a stand-alone, personal-type computer system, such as a laptop computer. Various other computing systems are within the scope of the invention, including palm size computing devices, desktop computers, specific purpose computing or processing apparatus, to mention only a few. All such devices are, at some time or other, expected to communicate with a computer network that is not connected to the computer system 10.

A data storage medium 12 is used to transfer data to and from the computer system 10. Medium 12 can be a floppy disk, a hard disk cartridge, a flash card or other "fixed" memory storage device, a writable CD-ROM, or any other device which allows data to be removed from the computer system 10, moved to another location, and written with new data which can again be used by the computer system 10. Lines 14 in FIG. 1 indicate that the medium is physically transferrable between the computer system 10 and the access terminal apparatus 16.

The access terminal apparatus 16 is the main device which is used to process the data on the storage medium 12 and furnish the connection to the computer network. In this regard, the terminal apparatus 16 includes a device (not shown in FIG. 1) for receiving the data from the storage medium 12 and for putting new data onto the storage medium 12. This can be, for example, a disk drive of the proper size and type, an infrared or radio frequency transceiver unit, an optical scanning and printing unit for processing hard-copy storage mediums, or a combination of one or more of these units. For example, the terminal apparatus 16 may have both a 3½ inch disk drive and a flash card reader to handle both types of data storage mediums. Ultimately, the terminal apparatus 16 is connected to a computer network, such as the Internet, across which the data is to be sent. The invention is equally applicable to less publicly available networks than the Internet, such as private company, group, building, or government networks. A modem can be used to connect the terminal apparatus 16 to the computer network, although other means, such as a direct connection, are within the contemplation of the invention.

In a specific use of the equipment which is contemplated by the invention, a user of the computer system 10 may wish to check and or send e-mail (electronic mail) over the computer network. To do this, the user runs a special program on the computer system 10 that configures any outgoing mail in an acceptable format and places it onto the data storage medium 12. Account information identifying the user is also placed onto the storage medium 12. The medium 12 is then removed from the system 10 and transferred to the terminal apparatus 16 where it is inserted or connected to an appropriate reading device. The terminal apparatus 16 determines that the e-mail data is in the proper form and that the account is valid (this may require communication over the network), and then sends the e-mail data across the network and receives any e-mail data from the network which is destined for the user. Any received e-mail is written to the storage medium 12 which is removed by the user and taken to the computer system 10 for viewing. Other uses of the invention beyond this simplified description should be apparent.

FIG. 2 shows a more detailed view of terminal apparatus which may be used in this invention to carry out the desired interfaces with the user and the computer network. The terminal apparatus 16 uses a disk drive 18 which is compatible with the storage medium, or floppy disk 12A. The modem 20 furnishes the means for connecting the terminal apparatus 16 to the computer network. A user display 22 is used to visually communicate to the user various status signals during the use of the terminal apparatus 16. In addition, the display can also be used to display information about the transaction, or communication session, which starts when the disk 12A is inserted into the drive 18. This could include instructions on operation, account information, list or full view of outgoing data or e-mails, list of or full view of incoming data or e-mails, and/or mail response options, among other things. While a visual alphanumeric display may be used, graphical displays, indicator lights, and/or audible signals may also be employed within the contemplation of the invention.

The invention could be operated in a completely automatic mode. That is, the user does nothing at the terminal apparatus 16 except simply insert the disk 12A and wait for the process to finish, which could be indicated by a flashing light, or even just an automatic ejection of the disk 12A. Thus, the complete task of processing the account data, sending and receiving the communications data, writing any new data onto the disk 12A, and signalling the completion of the process, could be accomplished in a short time without any intervention by the user other than inserting and removing the disk 12A. With such a process, the new data, i.e. e-mail, would be reviewed when the user views the disk 12A back at his own computer system.

Also shown in FIG. 2 is a keyboard 24 for allowing the user to input information and control instructions to the terminal apparatus 16. This could include such things as a user verification or PIN number, e-mail acknowledgement responses, e-mail message filing, among others. The processing unit 26 controls the data and control functions for the various subunits of the apparatus. With current state of the art apparatus, this would be a functional computer system with executable instructions in memory, a processing chip or IC, and support components for interfacing with the various peripheral devices. Here again, the procedure is to properly prepare the disk 12A on a remote computer and then bring the disk to the terminal apparatus 16 and insert it into the disk drive 18. After any required responses from the user, the apparatus 16 communicates with the computer network and uploads the data from the disk 12A, then downloads any data to be written onto the disk 12A. With the aid of the account information on the disk 12A, the user's account can also be automatically debited for using the system. This could be done by having the terminal apparatus 16 automatically send data over the computer network to another computer, or Internet site, that contains the billing and account data for the system users. As a plus, the new current balance in the account could be a part of the data written onto the disk 12A for later viewing by the user. As an alternative, or in addition to writing the data on the disk 12A, the balance data could be displayed on the user display 22. The account could be a prepaid account whereby every use debits or subtracts from the prepaid balance. Or, the account could be of the normal accrual type whereby every use adds to the balance for later payment by the user, or his company.

FIG. 3 generally illustrates the data structure of the data on the data storage medium, or disk 12A. The account information or data 28 identifies the user for the purpose of establishing the user's right to use the terminal apparatus 16 for its intended purpose and may be used to direct the flow of the communications data on the disk to and from the computer network. The data 30 to be sent to the computer network and data 32 which is received from the communications network are also indicated in FIG. 3. All three data areas are symbolically shown as separate areas, although those skilled in the art will realize that data physically on the disk can be in many different forms and locations. Typically, the account data 28 and the data to the computer network 30 will be put on the disk by the user at the remote or portable computer, such as computer system 10 shown in FIG. 1. The communications data 32 would typically be data written to the disk by the terminal apparatus 16 after it was downloaded from the computer network. Although the account information 28 may be used and sent to the computer network in its original form, the information may be processed and reconfigured into account data better understood by the receiving system although still responsive to the original account data.

Various forms may be used for the data on the disk 12A and some or all of the data may be fixed. It is also possible that the account data can be just a part of the other data on the disk 12A. For example, the disk 12A may contain just e-mail messages to be sent to the computer network. Typically such messages identify the user by his e-mail address. If security was not a primary issue, that may be all that would be necessary to identify the user to the terminal and/or the remote site in order to allow access and account for the use on the system. However, more likely than not, the data or e-mail would require additional information to access the host computer over the computer network and get or send e-mail or data, such as an e-mail password. In addition to a password to obtain access to the network information, a password or PIN may be desirable to authorize access to the full terminal apparatus functions. Granted, some limited access would be allowed to send the password to the authenticating site, but true data transfer access would be denied if the user was not properly identified as a current valid user of the system. Therefore, the account data 28, while not necessary in a bare system, provides for secure and efficient use of the system if it contains information in addition to the conventional e-mail routing and authorizing data. The communications data 30 and 32 is primarily the data transferred back and forth between the computer system and the computer network, and could be basically in the form used by these two systems. The terminal apparatus 16 merely acts as a transfer means for this data between the disk 12A and the computer network, once the user has been approved to use the system and transfer the data.

The data placed on the disk 12A must be compatible with the user's computer system 10 and with the terminal apparatus 16, at least as far as being able to read and process the data. Therefore, the terminal apparatus 16 would be able to understand the format of the account data 28 and the format of the communications data 30. The computer system 10 must also be able to understand the format of the communications data 32. Thus, the software controlling each device must be capable of writing data in the form the other device can recognize and utilize. Of course, there are many programs currently available for structuring e-mail data for transfer to and viewing at another computer.

The software placing the account data on the disk 12A can be stand alone software installed just for this purpose. Or, on the other hand, this function can be provided by a suitable software package used on the computer system 10 for other purposes. For example, the computer's mail reader program may be modified to include the ability to enter the user's identity information and any passwords or PIN numbers. It would automatically place that on the disk 12A when it is writing e-mail messages to the disk 12A for transfer to the terminal apparatus 16. The mail reader program could also provide the preference or option to send the e-mail messages to the disk 12A rather than to a modem in the conventional use of the reader, and in the proper format for the terminal apparatus 16 to be able to process. Instead of using a modified mail reader program at the user's computer system 10 to properly load the disk 12A, a separate program may be used on the computer system 10 to load the account information and to "intercept" the e-mail data produced by the normal mail reader. to This "interception" simply takes the mail reader stored e-mail message(s), makes any necessary changes or additions to these e-mails to convert to the format required by the terminal apparatus 16, and stores the messages on the disk 12A. A similar but reverse process can be used for received messages, thereby allowing the normal mail reader to view and process these messages just the same as if they had come directly from the user's computer modem.

Changing a conventional e-mail reader program to write the e-mail data to the disk at the user's computer is considered a normal task for an experienced software engineer experienced with mail reader programming. The account data added to the disk would include the data that the system needs in addition to the e-mail address and message data. For example, the account data would include one or more of the following: user identification; user PIN; authorization code; e-mail password; list of already received data; and routing information to the user's host mail server, among others. In other words, the disk will contain not only the e-mail message data, but "supervisory" or "administrative" account data to insure authorized use of the system.

It is emphasized that various forms of the invention can be practiced and many variations thereof would be possible to those skilled in the art to which the invention pertains, once aware of this invention. However, all such systems would require the use of a data storage medium which is transferred between the computer and the terminal apparatus, with account data and communications data contained on the medium, and with the ability to receive new data that can be transferred back to the user's computer.

FIG. 4 is a diagram illustrating, in functional form, the functions of the processing unit in the terminal apparatus 16. Most, if not all, of the functions would be controlled or generated by the processing unit 26 (FIG. 2). The display driver 34 provides the data to the display which is visible to the user of the terminal. Control data path 36 indicates that some of the data displayed on the display can come through the data receiver 38 from the modem. The data displayed may also be generated internally (not illustrated) by the processing unit either independently or in response to received data. The same internal generation of control and data applies to the other illustrated functions. The control data would be data that assists the user in using the terminal apparatus, and data which can display a list or summary of the data received from the modem. The actual data, for example an e-mail message, is transferred across the communications path 40 to the display driver 34, in which case it may be displayed to the user, in full format or in abbreviated form. In other words, in the case of an e-mail message, the terminal could either display the complete message(s) downloaded, or just the message header. The complete message would allow the user to view the message without further activities, and the header-only data would allow the user to only see if and from whom a message was received. In some cases, the user would have the option to view only the headers but be able to select a header and view the entire message. In accordance with one of the advantages of the present invention, the communications data can be applied to the data writer 42 for transfer to a disk drive. This allows the user to read, delete, respond, and otherwise process the received e-mails, or other data, at his convenience at another computer system.

The data reader 44 and the data sender 46 permit the information or data from the disk drive to be sent to the modem for transfer to the computer network. The account data interpreter 48 and the communications data path 50 indicate the type of data sent to the modem. The communications path 50 handles the actual uploaded information, such as an e-mail message. The account data interpreter 48 gets the account data from the disk and either sends it directly on to the data sender 46, or processes this data and sends appropriate data to the sender in response to the read account data. In other words, the account, control, and identity information may be directly on the disk, or it may be determined internally in the terminal apparatus 16A from the account data on the disk.

The keyboard driver 52 merely illustrates that, in addition to data from the disk, a keyboard may be used to send data through the modem to the computer network. Likewise, the code authenticator 54 illustrates that the keyboard may be used to enter an authorization code or PIN which is necessary to allow full and complete access to the terminal functions. Path 56 illustrates that authorization may come directly from the disk data. Such would be the case when the code is placed on the disk at the user's computer system. The advantage of this is that no extra authorization is needed at the terminal apparatus, thus use thereof would be faster. The disadvantage is that anyone intercepting the disk with the authorization data could intercept the authorized data, or read the user's e-mail. Of course, if security concerns were minimal, the code authorization could be dispensed with completely and the disk would not need to have any authorization information on it.

Figure 5:
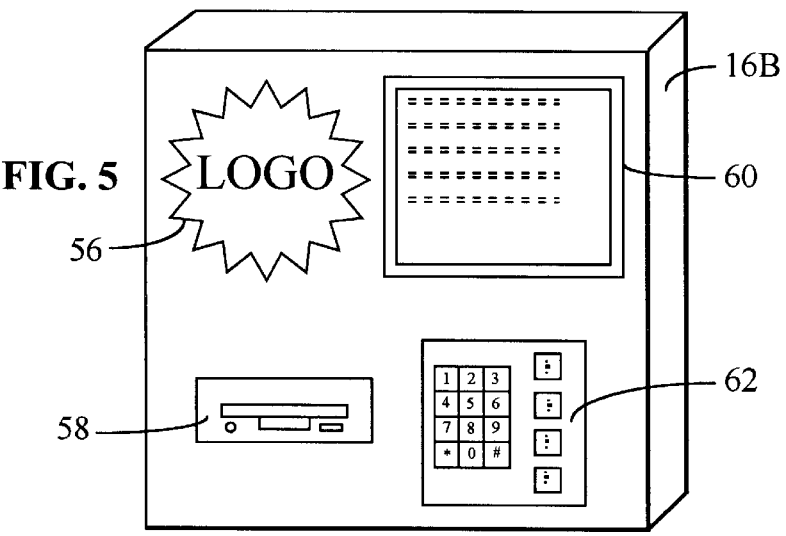
FIG. 5 is a view of the terminal apparatus showing its physical form as a kiosk.

FIG. 5 is a view of the access terminal apparatus 16B in the form of a kiosk for exchanging data. Such a kiosk may be free standing or attached to a wall or partition, or mounted flush into the wall or partition. Typical locations for public access and use would be at airport terminals, bus stations, campgrounds, truckstops, convenience stores, service stations, etc., where people frequent while traveling with a computer but without easy or inexpensive access to a computer network. For non-public or corporate users, typical locations would be large office complex buildings, factories, police stations, etc.

The apparatus 16B includes an eyecatching logo 56, a disk drive 58, a video display 60, and a keypad 62. A typical usage would be as follows. The user prepares an e-mail message on his portable laptop computer to send over the Internet to a distant party. Software on the laptop formats the message with the message data and with account information about the user. This information is placed onto a disk in the laptop computer. The user, while in the vicinity of the terminal apparatus 16B, inserts the data containing disk into the disk drive 58. Display 60 tells the user to enter his PIN number on keypad 62. Upon so doing, the terminal apparatus sends authentication data to a remote computer over the computer network for validation. Assuming a proper validation, the apparatus next sends the e-mail message over the network to the desired location. It then checks for new incoming e-mails, and if any, receives and writes them to the disk, along with displaying a list of the received e-mails on the display 60. The user can select, via the keypad 62, a particular message for viewing directly and immediately on the display 60, or simply remove the disk and read and/or process the received messages later on his own computer, from the data stored on the disk.

Many other modes of operation are also within the intent of this invention. Besides buttons for code entry, the keypad 62 may have other buttons for control entry, such as "CLEAR DISPLAY" for manually erasing the screen of the e-mail data before leaving the apparatus, "EJECT DISK" for ejecting the disk without using the ejector button on the disk drive, "ACKNOWLEDGE" for responding to a party that the message was received, and "SELECT" for indexing through all the received e-mails to select a specific one. Other functions and buttons are not covered in this simplified example. Also, no keyboard is shown for responding to data at the terminal apparatus, although such is within the contemplation of this invention.

FIG. 6 illustrates the process of using the invention.

First, some identifying, authorizing, or account data is placed upon the storage medium, as indicated in box 64. This will be used later to make sure that the use of the system is authorized and, in many cases, properly account for any charge for the use of the system. Next, as indicated in box 66, the actual data to be transferred to the computer network is stored on the storage medium. This could be the actual address and text of an e-mail message to be sent over the computer network. The storage medium is then physically moved (box 68) from the computer storing the data shown in boxes 64 and 66 to the access terminal apparatus where the data is read and processed. After determining that the user and/or data is in the proper form and authorized for transfer on the system, the data is sent across the computer network to its desired destination (box 70). In the case of e-mail data, any new e-mail messages directed to the authorized user are also transferred back to the terminal apparatus where they are stored on the storage medium (box 72). The ability to provide an optional display of some or all the data at the terminal is illustrated by box 74, and the ability to provide an optional response to the data at the terminal is illustrated by box 76.

After receiving the data, the user moves the storage medium back (box 78) to his computer where the data can be processed (box 80). That is, if the messages or data are not viewed or responded to sufficiently at the terminal, the user can process the data at his own computer from the data stored on the storage medium. Whether or not the data is processed at the terminal or at the user's computer will depend on several factors, including the capabilities of the terminal for local viewing and/or response, the length of viewing or response required, the time available for the user to conveniently respond or view at the terminal, and any degree of security built into the received data that would prevent processing of the data at the terminal. Although not illustrated, the data from the computer network may indicate the current balance in the user's account, and the user may respond to increase the balance.

It is emphasized that numerous changes may be made in the above-described embodiments without departing from the teachings of the invention. For example, a paid-up account may not be necessary to use the system, especially if advertisements were inserted into the returned communications data. Therefore, posting a charge for every use would not be necessary. Also, for example, the e-mail password and any other confidential information on the medium could be encrypted so that someone finding a lost storage medium would not be able to detect the confidential information. Decryption could take place at the terminal with the user entering a decryption key, or in the computer network where a secure decryption key has previously been stored. In addition, the data on the disk may not include any e-mail data to be uploaded or sent to the computer network, if the user is just checking for new e-mails.

It is intended that all of the matter contained in the foregoing description, or shown in the accompanying drawing, shall be interpreted as illustrative rather than limiting.

What I claim as my invention is:

1. A method of conveniently transferring e-mail communications data between a non-connected first computer system and a computer network, said method including the steps of:

executing a program on said first computer system which places data to be transferred to the computer network onto a data storage medium in a form which can be used by a remote, special purpose kiosk, with said kiosk having means into which said data storage medium may be inserted and removed, said program execution taking place on the first computer while said first computer is not connected to said kiosk or to said computer network, with said data including said e-mail communications data and user account identity information;

removing and physically moving the storage medium between the first computer system and the kiosk;

inserting the storage medium into the kiosk;

automatically reading, at the kiosk, the account information on the medium and transferring data to the computer network which is in response to the account information;

automatically sending, to the computer network, said e-mail communications data stored on the medium;

automatically receiving, from the computer network, e-mail communications data the user is authorized to receive, with said automatic steps of reading, sending and receiving occurring without requiring a manual entry of account information or e-mail data at said kiosk;

storing at least a portion of said received e-mail communications data on said storage medium;

indicating to the user that the exchange of e-mail communications data is finished, thereby informing the user that said data storage medium may be removed from the kiosk;

removing the storage medium from the kiosk;

moving the storage medium back to the first computer system; and inserting the storage medium into the first computer system and processing at least a portion of the received e-mail communications data stored on the medium.

2. The data transferring method of claim 1 including the additional step of displaying to the user of the kiosk at least a portion of any e-mail data received from the computer network.

3. The data transferring method of claim 2 including the additional step of responding at the kiosk to at least a portion of the received e-mail data.

4. The data transferring method of claim 1 including the additional step of posting a charge to the identified account for using the kiosk.

\* \* \* \* \*